United States Patent [19]

Mellor

[11] 4,094,552
[45] June 13, 1978

[54] ARRANGEMENT FOR PNEUMATIC TRANSPORTING OF MATERIALS

[75] Inventor: Joachim Mellor, Bienrode, Germany

[73] Assignee: Bühler-Miag GmbH, Braunschweig, Germany

[21] Appl. No.: 753,485

[22] Filed: Dec. 22, 1976

[30] Foreign Application Priority Data

Jan. 8, 1976 Germany .............................. 2600546

[51] Int. Cl.² ...................... B65G 53/04; B65G 53/54
[52] U.S. Cl. ........................................ 302/29; 302/64
[58] Field of Search ....................... 302/29, 64, 17, 1; 193/2 B, 7, 25 R, 25 B, 32, 2 R

[56] References Cited

U.S. PATENT DOCUMENTS

| 2,604,246 | 7/1952 | Hood | 302/64 |
| 2,829,600 | 4/1958 | Sveda | 302/64 X |
| 2,936,994 | 5/1960 | Lau | 302/29 X |
| 2,948,385 | 8/1960 | Todd | 193/2 R X |
| 3,265,445 | 8/1966 | Cronin | 302/64 |

Primary Examiner—John J. Love
Assistant Examiner—James L. Rowland
Attorney, Agent, or Firm—Michael J. Striker

[57] ABSTRACT

An apparatus for pneumatic transporting of materials particularly those having a tendency to form deposits, is disclosed. A conduit is adapted for transporting such materials and has a resiliently deformable wall; a substantially rigid supporting element is arranged outwardly of this wall so to define a gap with the same; and an arrangement is provided in the gap for intermittently resiliently deforming the wall so as to dislodge deposits of the material which tend to form on an inner surface of the wall.

15 Claims, 4 Drawing Figures

ARRANGEMENT FOR PNEUMATIC TRANSPORTING OF MATERIALS

BACKGROUND OF THE INVENTION

The present invention relates to an arrangement for pneumatic transporting of materials. More particularly it relates to an arrangement for transporting such materials which have a tendency to form deposits.

Different materials, such as, for example, carbon black utilized in the manufacture of rubber, are very greasy and therefore have a tendency to stick to inner walls of transport conduits and to form deposits thereon. This results in that the transport conduit after very short time, even after some minutes following the beginning of operation, becomes obstructed by the material to be transported and further transportation of the material through the conduit is thereby interrupted. This is characteristic for all pneumatic transport systems, and particularly for the systems which comprise transport conduits having curved sections.

It is known that to prevent such interruption of the operation of pneumatic transport systems comprising flexible transport conduits, an operator must knock against sections of the flexible transport conduit which are vulnerable to this clogging, so as to dislodge the material which form the deposits in inner walls of these sections. However, this is fairly difficult, time consuming and requires the constant presence of an operator during the entire operation of the transport system.

To avoid the formation of the deposits of the material and to eliminate manual removal of the same, it has been proposed to provide the vulnerable sections of the flexible transport conduits with vibrators, which continuously transmit vibrations to these sections during the entire operation of the transport system and therefore prevent sticking of the transported material on the inner walls of the transport conduits. In this case the transport conduits, which often have considerable length and comprise a plurality of curved sections, are also complex construction and so expensive that such pneumatic transport systems are not used in industry.

It has been further proposed in the art to clean rigid transport pipelines of pneumatic transport systems by means of flexible pneumatic conduits located inside the rigid pipelines. In this case the rigid tube and the flexible inner conduit is constituted of separate sections, which sections have end flanges for connecting the sections to one another. An outer surface of the flexible conduit is provided with projections spaced from one another and forming a plurality of recesses between the inner surface of the rigid tube and the outer surface of the flexible conduit. Air is fed between the above mentioned surfaces, deforms the flexible conduit and removes the material from the inner surface thereof. This construction is also very complex and expensive. In addition, it is required to form each curved section of the tube as a separate part and thereafter to connect it to adjacent sections. It should be also noted that this construction is applicable exclusively for use with rigid transport conduits.

SUMMARY OF THE INVENTION

Accordingly, it is an object of the present invention to provide an improved arrangement for transporting of materials, particularly those having a tendency to form deposits, which avoids the aforementioned disadvantages.

More particularly, it is an object of the present invention to provide an improved arrangement for pneumatic transporting of materials which performs easy and efficient dislodging of deposits of the transported materials formed on inner surfaces of a flexible transport conduit.

Another object of the present invention is to provide an improved arrangement for pneumatic transporting of material which performs dislodging of the deposits of the transported materials formed on the inner surface of the flexible transport conduit and at the same time is of a simple construction, each to manufacture, and does not require high expenditures.

Still another object of the present invention is to provide an improved arrangement for pneumatic transporting of materials which can perform dislodging of the deposits of the transported material formed on the inner surface of a flexible transport conduit of any length and any complex shape and contour.

In keeping with these objects, and with others which will become apparent hereafter, the arrangement for pneumatic transporting of materials in accordance with the present invention, briefly stated, comprises a conduit adapted for transporting of the materials and having a resiliently deformable wall, a substantially rigid supporting element arranged outwardly of the wall so as to define a gap with the same, and means in the gap for intermittently resiliently deforming the wall so as to dislodge deposits of the materials which tend to form on an inner surface of the wall.

The means for intermittently resiliently deforming the wall may be formed as an intermediate member adapted to intermittently bulge to a size exceeding the size of the gap between the wall of the conduit and the supporting element.

The intermediate element may outwardly surround the flexible wall of the conduit. This element may be configurated as a wire coil. It also may be constituted of a plurality of rings spaced from one another in a longitudinal direction of the conduit. The rings may be connected with one another by connecting means. At least some of the rings may be connected to the conduit.

When the conduit comprises at least one section which is vulnerable to deposition thereon of the material, the means for deforming the flexible wall of the conduit extend over the vulnerable section so as to deform the same and to dislodge deposits of the material from an inner surface of this section of the conduit.

At least one additional means for intermittently resiliently deforming said wall are provided, which means extend over a further section of the conduit spaced from the said vulnerable section thereof.

Means are provided for simultaneously actuating the means for deforming the wall and the additional means for deforming the wall so as to simultaneously deform the section and the further section of the conduit and to dislodge the deposits of the material from the inner surfaces of both sections.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
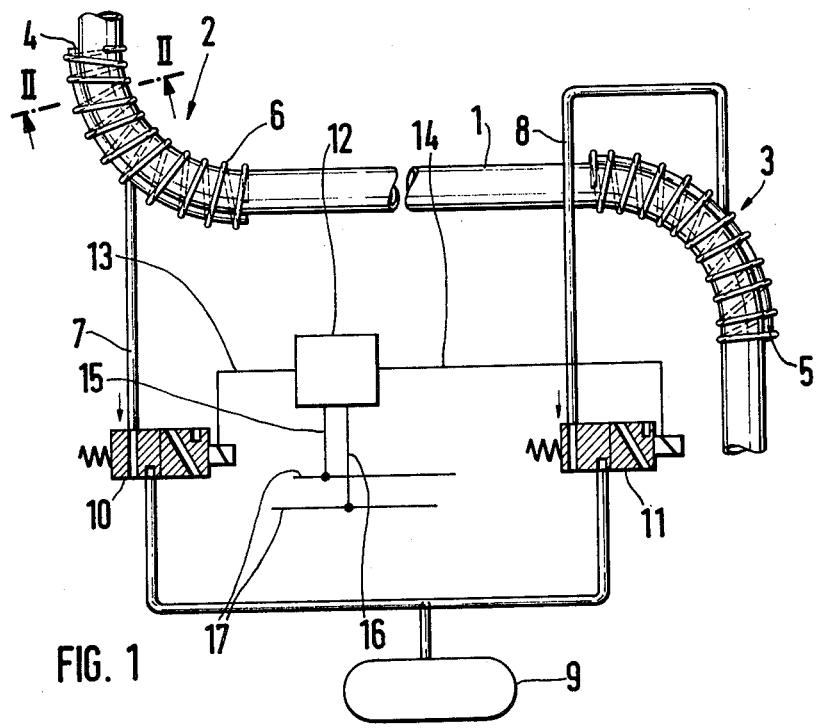
FIG. 1 illustrates an arrangement for pneumatic transporting of materials in accordance with the present invention.

FIG. 1 illustrates an arrangement for pneumatic transporting of materials such as, for instance, industrial black carbon, in accordance with the present invention. It shows a conduit identified by reference numeral 1 which extends from a loading station to a receiving station, which stations are not shown in the drawings. Conduit 1 has a resiliently deformable wall of a flexible material such as, for instance, polyvinylchloride in a textile enclosure.

Substantially rigid supporting elements are provided outwardly of the flexible wall of the conduit so that each of the elements forms a gap with the flexible wall. In accordance with one of the embodiments of the invention shown in FIG. 1 the supporting elements are formed as wire coils 6 made of spring steel and outwardly surrounding curved sections 2 and 3 of the conduit respectively, which are vulnerable to form deposits on inner surfaces thereof.

Means are provided in the gap between the flexible wall of the conduit and the supporting elements 6 for intermittently resiliently deforming the flexible wall of the conduit 1. In the preferred embodiment of the invention this means are intermediate members 4 and 5 adapted to intermittently bulge to a size exceeding the size of the gap. Each of the intermediate members 4 and 5 is made as an elastic air hose which has a circular cross-section and is closed at both its ends.

The wire coils 6 are made of a wire of such a diameter that the wire coils do not deform during bulging of the air hoses 4 and 5. At the same time, the wire coils have convolutions of such diameter that the air hoses 4 and 5 in an unbulged state have a substantially elliptical cross-section.

The air hoses 4 and 5 are connected in parallel by means of tubular conduits 7 and 8, respectively, with a conventional arrangement 9 for supplying compressed gas, e.g., air, such as, for instance, a vessel containing compressed air. This vessel must supply compressed air at a pressure exceeding the pressure of gas within the conduit 1, by for example at about 1.5 atmospheres if the pressure in conduit 1 is at about 1 atmosphere.

If there is a pressure-air main available, the air hoses 4 and 5 may be connected to the main through a conventional device for reducing air pressure. The tubular conduits 7 and 8 are provided with valves 10 and 11, respectively, which valves may be, for instance, per se known three-port two-position valves with mechanical restoration by means of a return spring. The valves 10 and 11 provide alternate communication of the respective tubular conduits 7 and 8 either with the atmosphere, or with the source of compressed air 9. An electrical control unit 12 is provided for simultaneously actuating the valves 10 and 11, which control unit 12 is connected, on the one hand, with the valves 10 and 11 by means of electrical conductors 13 and 14, respectively, and, on the other hand, with an electrical network 17 by means of electrical conductors 15 and 16. A commercial impulse generator with adjustment of time steps and intervals may be used as the electric control unit 12. The control unit 12 is so adjusted that during the operation of the transport conduit the both air hoses 4 and 5 are connected alternately with atmosphere through the valves 10 and 11 for equal periods of time of, for instance, 30 sec. and with the arrangement for supply the compressed air 9 for equal periods of time of, for instance, 5 sec.

Figure 2:
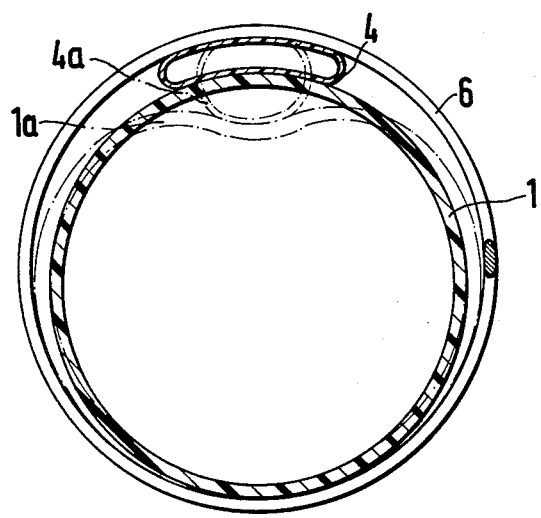
FIG. 2 is an enlarged cross-sectional view of a flexible transport conduit, intermediate element and a supporting element, taken on the line II—II of FIG. 1.

By intermittently admitting the compressed air into the air hoses 4 and 5 the latter bulge for short periods of time so as to form a substantially circular cross-section identified by reference numeral 4a. Since the air hoses 4 and 5 are outwardly surrounded by the nondeformeable supporting members 6, they deform in a direction towards the flexible transport conduit 1 and thereby deform the flexible wall of the latter, as shown in FIG. 2 and identified by reference numeral 1a. By means of thus repeatedly deforming the transport conduit, and particularly the curved sections 2 and 3 thereof, the material forming deposits on the inner wall of the transport conduit is dislodged, falls into the transport flow, and thereby is further transported through the transport conduit 1.

Figure 3:
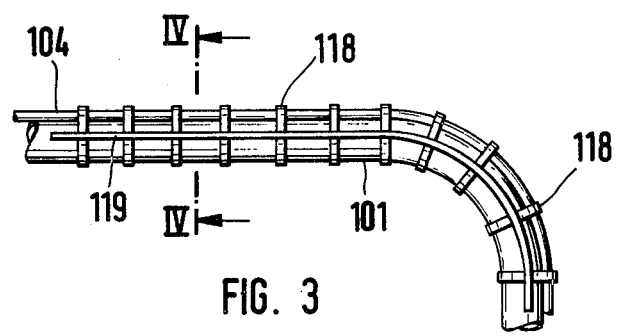
FIG. 3 is a side view of the flexible transport conduit provided with a supporting member in accordance with another embodiment of the invention.
Figure 4:
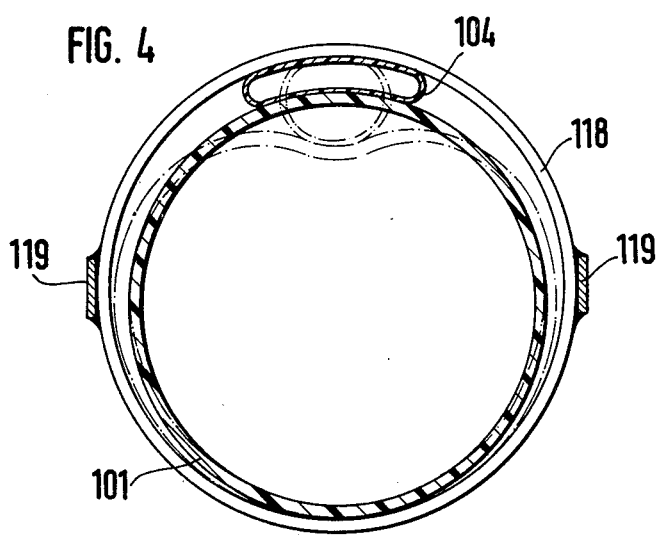
FIG. 4 is an enlarged cross-sectional view of a flexible transport conduit, taken on the line IV—IV of FIG. 3.

FIGS. 3 and 4 illustrate another embodiment of the present invention and shows a flexible conduit identified by reference numeral 101. A supporting element is provided, which in this embodiment of the invention is constituted of a plurality of steel rings 118, each surrounding the transport conduit 101 and spaced from one another in a longitudinal direction of the same. The rings 118 must meet the same requirement as the wire coils 6 of the first embodiment of the invention with regard to a diameter of rings and diameter of a wire of which the rings are made. The supporting element in form of the plurality of the rings 118 can be mounted on the transport conduit 101 more easily than that of in form of the wire coil 6, and can more exactly correspond to various shapes of the transport conduit 101. Similarly to the first embodiment of the invention, an air hose 104 is provided located intermediate the transport conduit 101 and the rings 118 and performing the same function as the hoses 4 and 5.

Connecting means are also provided preventing the rings 118 from displacement relative to one another and also in the longitudinal direction of the transport conduit 101. This is required, for instance, in the case when the curved portions of the transport conduit extend in a vertical direction. These connecting means are configurated as two connecting bars 119 located at opposite sides of diameters of the rings 118, to which connecting bars 119 the rings 118 are fixedly or movably connected. At least some of the rings 118 may be connected to the transport conduit 101. All other elements and the mode of operation of the arrangement shown in FIGS. 3 and 4 correspond those of the arrangement shown in FIGS. 1 and 2.

The aforedisclosed arrangement for pneumatic transporting of materials, in accordance with the present invention, provides for highly advantageous results.

It provides easy and efficient dislodging of deposits of the transported materials from the inner surface of the flexible transport conduit. At the same time, this arrangement is of simple construction, easy to manufacture, and does not require high expenditures. This arrangement provides for the dislodging of deposits from the inner wall of conduits which may have any desired length and any orientation.

It will be understood that each of the elements described above, or two or more together, may also find a useful application in other types of construction differing from the types described above.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an arrangement for pneumatic transporting of materials, particularly those having a tendency to form deposits, a combination comprising a conduit adapted for transporting of the materials and having a resiliently deformable wall; a substantially rigid supporting element arranged outwardly of said wall so as to define a gap with the same; and a hollow intermediate member located in said gap and adapted to intermittently bulge to a size exceeding the size of said gap between said wall and said supporting element and to thereby bear upon said supporting element and said wall so as to intermittently inwardly resiliently deform said wall whereby deposits of said materials which tend to form on an inner surface of said wall are dislodged.

2. The combination as defined in claim 1, wherein said intermediate member is a periodically inflatable hose.

3. The combination as defined in claim 1, wherein said gap defined between said supporting element and said conduit communicates with the surrounding atmosphere.

4. The combination as defined in claim 1, wherein said intermediate member bounds a hollow which is sealed from said gap and adapted to receive a fluid therein; and further comprising actuating means for feeding the fluid into the hollow of said intermediate element so as to cause bulging of the latter.

5. The combination as defined in claim 1, wherein said supporting element is enclosed and outwardly surrounds said flexible wall of said conduit.

6. The combination as defined in claim 1, wherein said supporting element is configurated as a wire coil.

7. The combination as defined in claim 1, wherein said supporting element is constituted of a plurality of rings spaced from one another in a longitudinal direction of said conduit.

8. The combination as defined in claim 7, and further comprising connecting means adapted for connecting said rings with one another.

9. The combination as defined in claim 7, and comprising further connecting means adapted for connecting at least some of said rings to said conduit.

10. The combination as defined in claim 1, wherein said conduit comprises at least one section which is vulnerable to formation thereon of deposits of said material; said intermediate member extending over said section of said conduit so as to dislodge deposits of said material from an inner surface of said wall of said section.

11. The combination as defined in claim 10, and further comprising at least one such additional intermediate member extending over a further section of said conduit spaced from the first-mentioned section thereof, so as to dislodge deposits of said material which form on an inner surface of said wall of said further section.

12. The combination as defined in claim 11; and further comprising actuating means for simultaneously actuating said intermediate member and said additional means for deforming said wall so as to simultaneously dislodge deposits of said material from the inner surfaces of said walls of said section and of said further section of said conduit.

13. A method of pneumatic transporting of materials, particularly those having a tendency to form deposits, through a conduit having a resiliently deformable wall, comprising the steps of providing a substantially rigid supporting element; arranging the supporting element outwardly of the wall of the conduit so as to define a gap with the same; providing a hollow member adapted to intermittently bulge to a size exceeding the size of the gap between the supporting element and the conduit; arranging the hollow member in the gap between the supporting element and the wall of the conduit; and intermittently bulging said hollow member so that the latter intermittently inwardly resiliently deforms the wall of the conduit and thereby causes deposits of the materials which tend to form on an inner surface of the wall to become dislodged.

14. The method as defined in claim 13, wherein said steps of providing the supporting element and arranging the hollow member in the gap between the conduit and the supporting element include forming the gap which communicates with the surrounding atmosphere and sealing a hollow of the hollow member from the gap.

15. The method as defined in claim 14, and further comprising the step of intermittently receiving a fluid in the hollow member so as to intermittently bulge the latter.

* * * * *